US007683521B2

(12) United States Patent
Bechhoefer

(10) Patent No.: US 7,683,521 B2
(45) Date of Patent: Mar. 23, 2010

(54) RADIO FREQUENCY SURFACE ACOUSTIC WAVE PROXIMITY DETECTOR

(75) Inventor: Eric Bechhoefer, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 777 days.

(21) Appl. No.: 11/633,988

(22) Filed: Dec. 5, 2006

(65) Prior Publication Data
US 2008/0129144 A1 Jun. 5, 2008

(51) Int. Cl.
*H01L 41/08* (2006.01)
*H03H 9/25* (2006.01)

(52) U.S. Cl. .............................. 310/313 R; 310/313 D
(58) Field of Classification Search .................. 310/313
See application file for complete search history.

(56) References Cited

U.S. PATENT DOCUMENTS

| | | | | |
|---|---|---|---|---|
| 4,980,869 | A * | 12/1990 | Forster et al. ................. | 367/99 |
| 5,028,920 | A * | 7/1991 | Dombrowski ............... | 340/904 |
| 5,076,384 | A * | 12/1991 | Wada et al. .................. | 180/169 |
| 5,515,341 | A * | 5/1996 | Toda et al. ................... | 367/140 |
| 5,648,642 | A * | 7/1997 | Miller et al. ............. | 178/18.06 |
| 7,388,810 | B2 * | 6/2008 | Campbell ..................... | 367/99 |
| 2007/0139165 | A1 * | 6/2007 | Liu ............................ | 340/10.4 |
| 2007/0283758 | A1 * | 12/2007 | Funo et al. ...................... | 73/570 |
| 2009/0109048 | A1 * | 4/2009 | Spivak et al. ............ | 340/686.6 |

FOREIGN PATENT DOCUMENTS

| JP | 2005092490 A | * | 4/2005 |
|---|---|---|---|
| JP | 2005315646 A | * | 11/2005 |

OTHER PUBLICATIONS

Sigal, et al, "Circuit design techniques for the high-performance CMOS IBM S/390 Parallel Server G4 microprocessor", IBM Journal of Research and Development, vol. 41, Nos. 4/5, 1997.
Pohl, "A Review of Wireless SAW Sensors", IEEE Transactions on Ultrasonics, Ferroelectrics, and Frequency Control, vol. 47, No. 2, Mar. 2000, pp. 317-332.
Pylarinos, "Charge Pumps: An Overview", date and source unknown.

* cited by examiner

*Primary Examiner*—J. SanMartin
(74) *Attorney, Agent, or Firm*—Scott D. Wofsy; Edwards Angell Palmer & Dodge LLP

(57) ABSTRACT

A proximity sensor for determining a position of an object. The proximity sensor includes a SAW device having a load end and an input end for receiving an input pulse. A sensing section connects to the load end of the SAW device. When the object is in a first position, the sensing section provides a first response indicative of the first position and, when the object is in a second position, the sensing section provides a second response indicative of the second position such that the position of the object can be determined based upon the response to the input pulse.

18 Claims, 5 Drawing Sheets

RADIO FREQUENCY SURFACE ACOUSTIC WAVE PROXIMITY DETECTOR

BACKGROUND OF THE INVENTION

1. Field of the Invention

The subject invention is related to proximity detectors, and more particularly, to an indirect proximity detector that uses surface acoustic wave (SAW) technology to reduce weight and complexity as compared to prior art sensors to meet the rigorous demands of the aviation industry.

2. Description of the Related Art

In aviation, mechanical subsystems are subject to very harsh conditions, so it is imperative that proper operation be verified. If systems do not operate properly, the consequences can be grave. Aircraft are subject to the Federal Aviation Regulations (FAR), which imposes very strict requirements on system performance. In terms of electrical equipment, FAR requires that equipment must be installed so that operation of any one unit or system of units will not adversely affect the simultaneous operation of any other electrical unit or system essential to the safe operation.

Proximity sensors have long been used to indicate the position of an object (e.g., whether a hatch is open or closed). These proximity sensors are typically the current sensing induction type and heavily armored for isolation from electromagnetic interference (EMI). The proximity sensor generates an electromagnetic field to sense metal objects passing within an inch or two. The heavy isolation armor and wire required are highly undesirable in weight sensitive aircraft design. By one estimate for fixed wing commercial aircraft at the time of filing, each extra pound has a recurring cost of over US $500, a non-recurring cost of over US $5000, and a life cycle cost of US $100,000. For rotary wing craft (e.g., helicopters), the costs are typically twice that of fixed wing aircraft. Yet, a 787 airplane has 150 heavy proximity sensors with over 40 lbs of associated wire.

As the industry looks to alternatives, the currently available options have their own disadvantages. One alternative is voltage sensing capacitive type sensors, which may require heavy isolation hardware due to capacitive coupled voltage due to EMI. Magnetic or optical interrupt switches, although much lighter due to less shielding, are very failure prone in the harsh conditions of aviation. Further, magnetic switches attract ferrous metal filings which inhibit the detection of near/far condition, resulting in false condition reporting. Optical switches suffer from foreign object contamination, such as dirt, which again reduces the performance of the device. Still further, each of these sensors still uses wire to power and report state. Wire requires a number of aircraft interactions for installation, which drives up cost in both design and manufacturability. Additionally, wire is heavy and difficult to troubleshoot when operation fails.

In view of the difficulties noted above, the inventor has recognized the need to reexamine how information is gathered and integrated into the control system of an aircraft. The inventor notes that transition to wireless sensor devices can alleviate many of the prior art difficulties despite the strict requirements of FAR and the harshness of the operating environment. For example, one particular wireless technology is known as the Zigbee protocol. However, Zigbee devices require power not only for the necessary Zigbee controller/router devices but for the sensors as well. Although these power requirements can be met wirelessly (e.g., sensor batteries), this approach is poorly suited to application in an aviation platform because of the associated failure rates and maintenance. Radio Frequency Identification (RFID) is another promising identification method. Although RFID has the capability to have a passive tag, the inductive coupling that is typically used requires close proximity and can perform below aviation standards.

SAW devices are another electronic component that the inventor recognizes as promising for addressing the problems of the prior art. SAW devices generate guided acoustic waves along a surface of the device. SAW devices are generally fabricated on single crystal anisotropic substrates that are also piezoelectric. SAW devices typically include one or more pairs of intertwined interdigital electrodes that form transducers (known as an interdigital transducer or IDT) to convert the electrical signals applied to the device into the electromechanical surface acoustic waves generated in the device and vice versa. SAW sensors are among the most sensitive and widely used physical and chemical sensors in gas and liquid environments. SAW devices have also been regularly used for the passive retrieval of information via a wireless retransmission of interrogative radio frequency (RF) signals. The information can be in the form of a modulated code embossed into the geometry of the device for use as an identification device (RFID) tags or information pertaining to a sensor that is attached as a load impedance. Such SAW devices require no battery for certain operations as the devices selectively reflect an interrogating RF pulse back to an interrogating transceiver with the information adapted into the RF signal.

A RFID SAW tag or sensor typically has a suitable antenna attached to the input/output IDT and receives an RF pulse sent from an interrogation unit. The RF pulse is transformed by the input/output IDT into an acoustic wave that propagates along the substrate. The substrate may have other IDTs or other structures to generate a reflection wave that the input/output converts to an electrical signal broadcast by the antenna. The reflective structures encoded on the piezoelectric substrate can return various information such as an identification number, pressure, temperature, strain and the like.

It would be beneficial therefore and it is the intent of the inventor of the subject disclosure, to provide a robust wireless sensor that is passively powered such as a SAW device and, preferably, functions indirectly to overcome the drawbacks of the prior art.

SUMMARY OF THE DISCLOSURE

The subject invention is directed to a new and useful proximity sensor that uses SAW technology with a sensing section to alleviate the need for heavy, complex and difficult to maintain sensors.

In one embodiment, the subject technology is directed to a proximity sensor for determining a position of an object. The proximity sensor includes a SAW device having a load end and an input end for receiving an input pulse. A sensing section is connected to the load end of the SAW device. When the object is in a first position, the sensing section provides a first response indicative of the first position and, when the object is in a second position, the sensing section provides a second response indicative of the second position such that the position of the object can be determined based upon the reflection of the input pulse.

Preferably, the SAW device includes a substrate having a first end and a second end, an input/output IDT connected to the first end, a reflective IDT connected to the second end and the sensing section. An antenna is electrically connected to the input/output IDT such that the input/output IDT converts an electrical signal of the antenna into a SAW that propagates across the substrate where the reflective IDT converts the SAW into an electrical signal, which is injected into the sensing section.

In one embodiment, when the object is in a first position the proximity sensor reflects the input pulse and when the object is in a second position the proximity sensor absorbs the input pulse. Preferably, the sensing section includes a resistor, an inductor connected in series with the resistor across the load end, wherein the inductor serves as a sensing component. A capacitor is connected in parallel to the inductor such that the resistor, inductor and capacitor are tuned to resonate at a pre-selected frequency.

In another embodiment, the sensing section includes a resistor, an inductor connected in series with the resistor across the load end and a capacitor connected in parallel to the inductor, wherein the inductor serves as a sensing component, and the resistor, inductor and capacitor are tuned to resonate a pre-selected frequency The subject technology is further directed to a proximity sensor for determining a position of an object including a SAW device for receiving an input pulse and a sensing section connected to the SAW device. When the object is in a first position the proximity sensor repeatedly passes through a charge cycle at a first frequency and when the object is in a second position the proximity sensor passes through the charge cycle at a second frequency such that the first and second positions can be determined based upon the first and second frequencies. Preferably, the sensing section includes a bridge rectifier connected to the SAW device, a switch provided intermediate the reflective IDT and an input of the bridge rectifier, a diode connected in parallel with an output of the bridge rectifier and a capacitor connected in parallel with the diode such that the capacitor is charged by an output of the bridge rectifier. In another embodiment, the sensing section includes at least one charge pump stage connected to the SAW device, a switch provided intermediate the reflective IDT and the at least one charge pump stage. A diode is connected in parallel with an output of the at least one charge pump stage. A capacitor is connected in parallel with the diode such that the capacitor is charged by an output of the at least one charge pump stage such that the diode periodically resets the capacitor.

Still further, the subject technology is also directed to a proximity sensor for indicating a far field position and a near field position of an object including a substrate having a first end and a second end with an input/output interdigital transducer (IDT) connected to the first end of the substrate. An antenna is electrically connected to the input/output IDT such that the input/output IDT converts an electrical signal of the antenna into a surface acoustic wave on the substrate. A reflective IDT is connected to the second end of the substrate for converting the surface acoustic wave on the substrate into an electrical signal. A sensing section connects to the reflective IDT for modifying the reflective IDT electrical signal based upon the near field position and the far field position of the object. Preferably, the object changes a characteristic of the sensing section as the object moves. The characteristic may be an inductance, a capacitance or a resonance.

These and other aspects of the subject invention will become more readily apparent from the following description of the preferred embodiments taken in conjunction with the drawings.

BRIEF DESCRIPTION OF THE DRAWINGS

So that those skilled in the art to which the subject invention appertains will readily understand how to make and use the apparatus of subject invention without undue experimentation, preferred embodiments thereof will be described in detail hereinbelow with reference to certain figures, wherein.

DETAILED DESCRIPTION OF THE PREFERRED EMBODIMENTS

Figure 1:
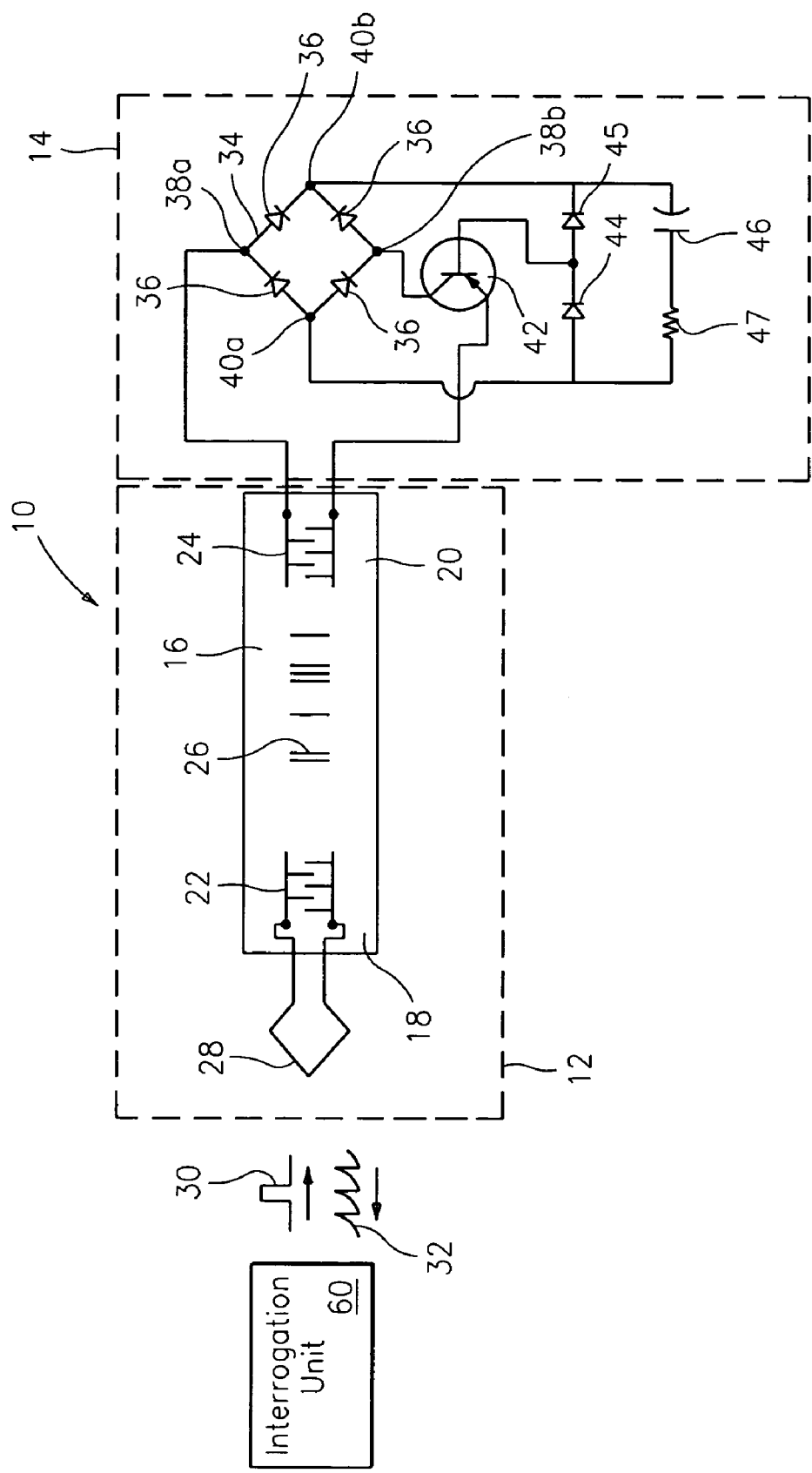
FIG. 1 is a schematic view of a proximity sensor constructed in accordance with the subject invention that includes a bridge circuit.

Referring now to the drawings, like reference numerals identify similar aspects or features of the proximity sensor of the subject invention. There is illustrated in FIG. 1, an exemplary embodiment of the proximity sensor contemplated by the inventor of the subject application, which is designated generally by reference numeral 10. The proximity sensor 10 includes, among other things, a SAW device 12 connected to a load or sensing section 14 for determining a position of a moving object (not shown). Generally, the proximity sensor 10 indicates that the object is in either a far field position or a near field position (e.g., open or closed, respectively). Many aviation subsystem would benefit from using the proximity sensor 10 to determine, for example, a door/hatch position, landing gear position, blade fold, weight on wheel and the like.

The proximity sensor 10 of the subject invention includes a substrate 16 for supporting a SAW as is well known. The substrate 16 has a first end 18 and a second end 20, each end 18, 20 being connected to an input/output IDT 22, 24 respectively. It is envisioned that the input/output IDTs 22, 24 may be identical but for clarity the IDT 24 will be referred to as the reflective IDT 24 hereinafter. The substrate 16 also may have reflective structures 26 embossed thereon.

An antenna 28 is electrically connected to the input/output IDT 22 such that the input/output IDT 22 converts an electrical signal of the antenna 28 into a SAW on the substrate 16. Typically, the input to the antenna 28 would be an RF pulse 30, which would be reflected to generate a reflected or output signal 32. The reflective IDT 24 is electrically connected to the sensing section 14. Thus, as the SAW propagates across the substrate 16, the reflective IDT 24 converts the SAW into an electrical signal, which is injected into the sensing section 14.

The sensing section 14 includes a bridge rectifier 34 connected to the reflective IDT 24. The bridge rectifier 34 has four diodes 36 arranged in the bridge circuit as shown to form two input corners 38a, 38b and two output corners 40a, 40b. Input corner 38a connects directly to the reflective IDT 24 whereas input corner 38b has a switch 42 provided intermediate the reflective IDT 24 and input corner 38b. The input corner 38b is connected to the collector of the switch 42 and the emitter of the switch 42 is connected to the reflective IDT 24. The switch 42 is a PNP type transistor, which is normally closed. The output corners 40a, 40b of the bridge rectifier 34 are connected in parallel with a pair of diodes 44, 45. The base of the switch 42 connects intermediate the diodes 44, 45. The pair of diodes 44, 45 are further connected in parallel with a capacitor 46 and a resistor 47.

In operation, the switch 42 is normally closed so that the bridge rectifier 34 charges the capacitor 46, which acts as a sensor. When a differential voltage on the capacitor 46 is greater than the bias voltage on the diode 44, the diode 44 fires to send the voltage on the capacitor 46 to zero. Consequently, voltage is sensed at the emitter of the switch 42 to open the switch 42. As a result of the switch 42 being open, the load on the reflective IDT 24 changes from zero to open. Preferably, diode 44 is a threshold diode with a forward bias of 0.5 or 0.6 volts. Diode 45 is a zero bias protection diode that protects the base of the switch 42 from voltage on the capacitor 46.

When the load is open, the reflective IDT 24 reflects all the SAW energy back across the substrate 16 to the input/output IDT 22 for broadcast by the antenna 28. The voltage across the diode drops to zero to effectuate closing the switch 42. With the switch 42 again closed, the load on the reflective IDT 24 returns to zero (i.e., the capacitor 46 starts recharging) and this cycle repeats. It is noted that varying the capacitance of the capacitor 46 will, in turn, vary the time for the capacitor 46 to cycle (i.e., charge and trip to zero). Further, the resistor R1 is selected to set the basic charge rate of the capacitor 46. It is also recognized that the open and close position effect the capacitance of the capacitor 46 and, in turn, the cycle time changes. In one embodiment, the resistor 47 is 50 Ohms and the capacitor 46 is 10 mF.

Figure 2:
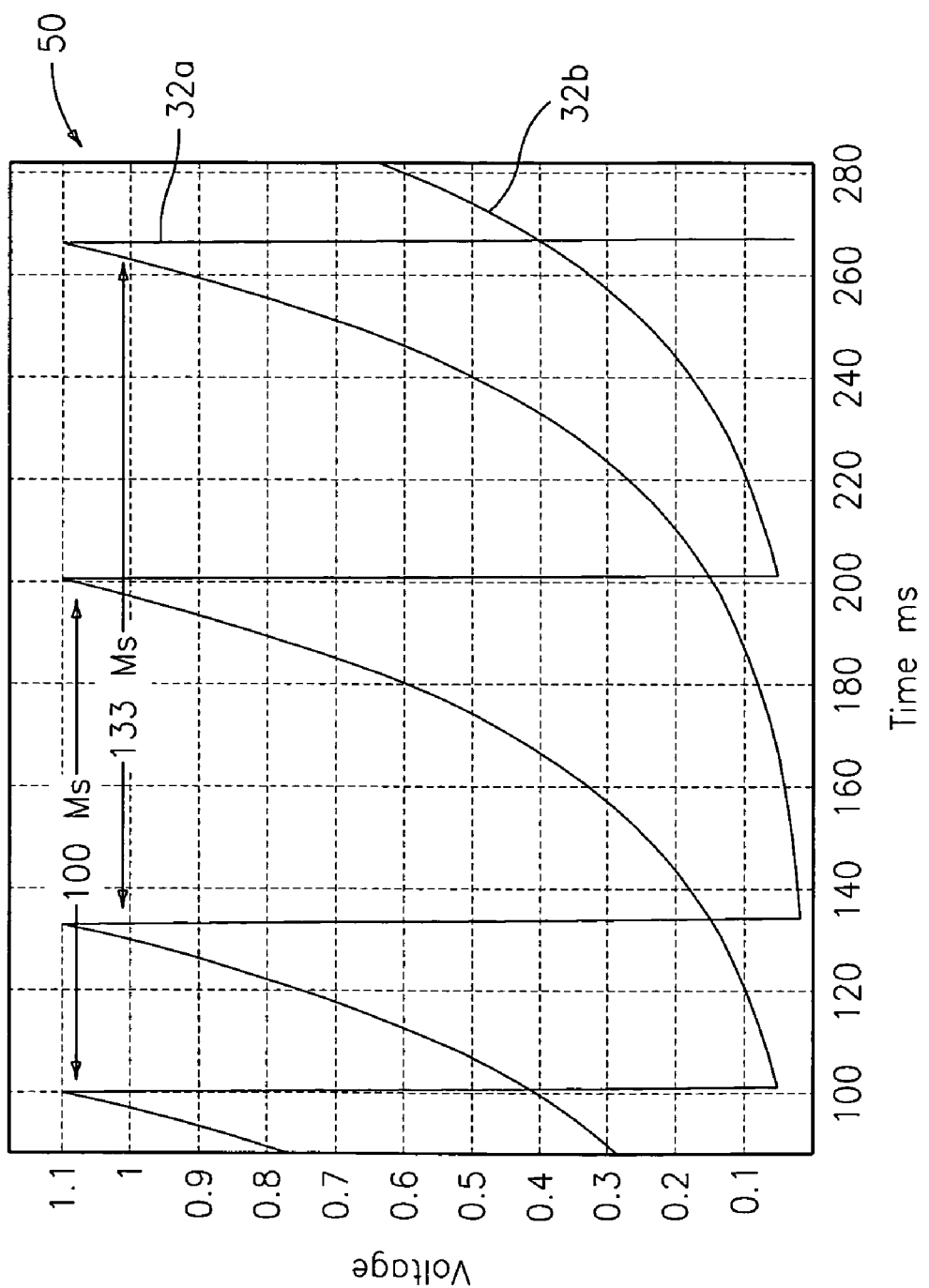
FIG. 2 is a graphical representation of output signals from the proximity sensor of FIG. 1 for the near field and far field positions.

Referring now to FIG. 2, there is shown a graph 50 representing the output signals from the proximity sensor 10 for the near field and far field positions. The graph 50 shows the reflected voltage output 32a, 32b in response to an input pulse 30 for the near and far field positions, respectively. Preferably, the input pulse 30 has a frequency of 1,000 Hz so that twenty to thirty interrogations manage to charge the capacitor 46, trip the switch 42 and reflect back the energy. In the case of thirty interrogations resulting in a cycle, the bandwidth of the proximity sensor 10 would be about 30 Hz.

In the near field position, the object being sensed is adjacent the capacitor 46 and, thus, the capacitance of the capacitor 46 is increased. With increased capacitance, the cycle time increases as shown in the near field line 32a. For example, the near field line 32a indicates a 133 Ms cycle time.

In the far field position, the object being sensed is away from the capacitor 46 and, thus, the capacitance of the capacitor 46 is decreased. With decreased capacitance, the cycle time decreases as shown in the far field line 32b. For example, the far field line 32b indicates a 100 Ms cycle time.

As can be seen, a relationship between capacitance based upon the position of the moving object and the time to cause a reflection across the substrate 16 is established. It is envisioned that an interrogation unit 60 would send a known input pulse 30 and read back the reflected output 32. Based upon reading the cycle time variations of the reflected output 32, the interrogation unit 60 can determine between near and far field positions of the moving object. The realized voltage is dependent on the sensitivity of the diodes 36. For a typical low power application, one should use a high performance zero-bias Schottky diode designed for RF and microwave devices. For example, Aeroflex Metelics of Sunnyvale, Calif. makes a diode device (part number MSS-20,051-c15) having a sensitivity of 800 mV/mW, resulting in a 0.554 V realized voltage.

Preferably, the reflective structures 26 are configured to return additional information to the interrogation unit 60. For example, the additional information may be an identification number so that the same interrogation unit 60 may check a plurality of proximity sensors. In another embodiment, the additional information relates to temperature, humidity and other factors that may affect the response of the proximity sensor 10. As a result, the interrogation unit 10 can actively self-calibrate to avoid erroneous positional readings.

Figure 3:
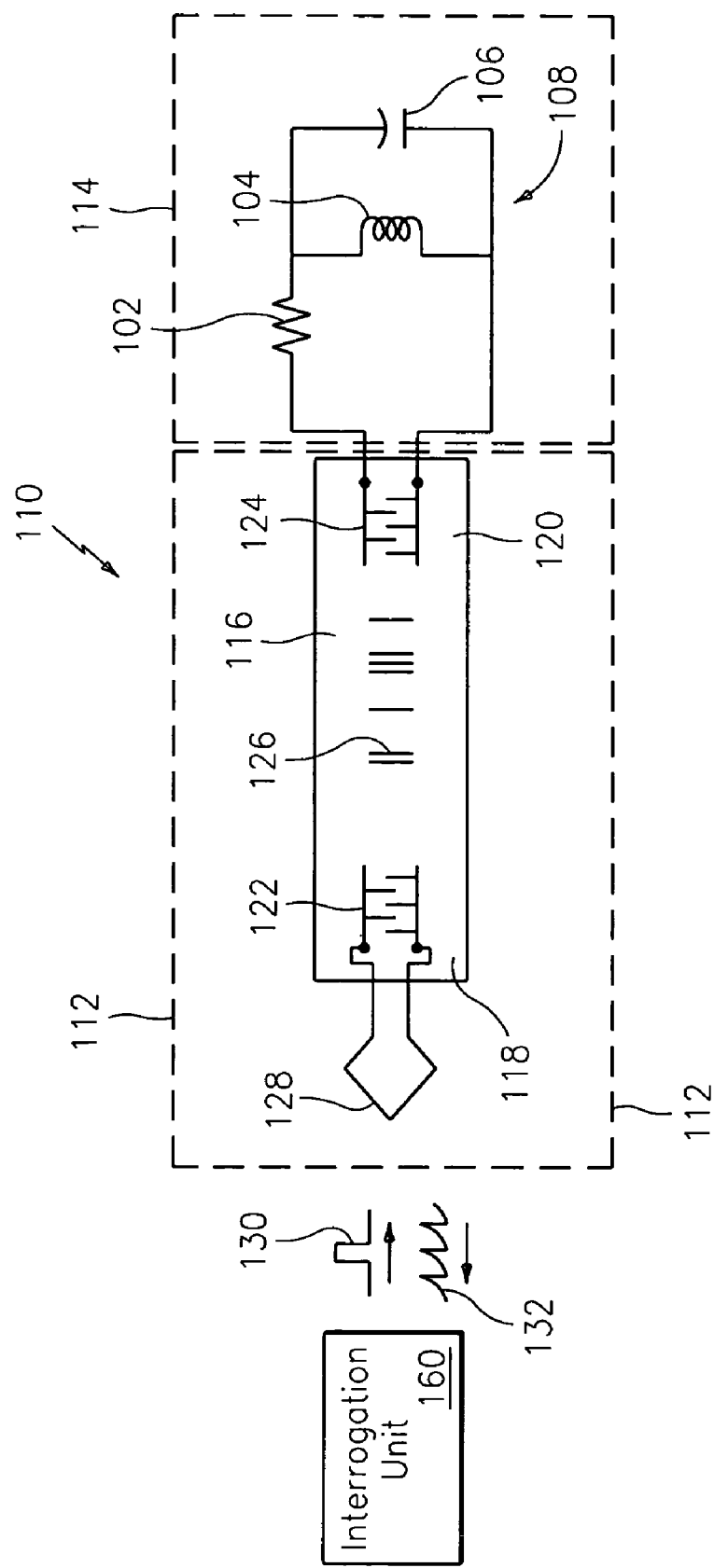
FIG. 3 is a schematic view of another proximity sensor constructed in accordance with the subject invention that includes an RLC resonant circuit.

Referring now to FIG. 3, another embodiment of a proximity sensor 110 is shown. As will be appreciated by those of ordinary skill in the pertinent art, the proximity sensor 110 utilizes similar principles to the proximity sensor 10 described above. Accordingly, like reference numerals preceded by the numeral "1" are used to indicate like elements when possible. The primary difference of the proximity sensor 110 in comparison to the proximity sensor 10 is the load or sensing section 114 connected to the SAW device 112. For brevity, the following discussion is directed to the sensing section 114. The sensing section 114 includes a resistor 102 connected in series with an inductor 104 across the reflective IDT 124. A capacitor 106 is connected in parallel to the inductor 104 to complete the RLC resonant circuit 108 of the sensing section 114.

Either the inductor 104 or the capacitor 106 can serve as the sensing component. Due to the technical challenge in manufacturing highly accurate inductors as a sensor, it is preferred to use the capacitor 106 as the sensing component in that the capacitance changes as the monitored object moves between the near and far field positions. Since the resistance and inductance are known, the RLC resonant circuit 108 can be tuned to the frequency of the reflective IDT 124 to yield varying reflection for the near and far field positions. As noted above, these values are selected to make the RLC resonant circuit 108 resonate in response to the input pulse 130.

In operation, when the proximity sensor 110 is interrogated with the object in the near field position, resonance feeds back to the reflective IDT 124. In other words, the load 114 is high causing a large reflect bit. In the far field position, when the proximity sensor 110 is interrogated, the capacitance is changed and the circuit 108 is no longer in resonance. Without resonance, the reflective IDT 124 sees the load 114 as not high. As a result, the load 114 causes a change in phase and decrease in amplitude of the reflect bit. Based upon this reflection information, the interrogation unit 160 can determine between the near and far field positions.

In a preferred embodiment, the proximity sensor 110 goes into resonance in the near field position. Thus, in the near field position, the inductance of the inductor 104 is as follows $$L=1/(4\pi2f_o2C)$$

where L is the inductance of the inductor 104, $f_o$ is the resonant frequency (i.e., the resonance of the reflective IDT 124) and C is the capacitance of the capacitor 106. Thus, the resonant frequency of the proximity sensor 110 is defined by:

$$f_o=1/2\pi\sqrt{LC}$$

The sensitivity of the proximity sensor 110 is a function of the Quality (Q) factor. The Q factor is defined as:

$$Q=\sqrt{L/C}/R$$

For a proximity sensor 110 in the ISM band, say at 2.4 GHz, the inductor 104 is 0.5 nH and the capacitor 106 has a range of 4.5 pf to 9 pf. Typically, a Q factor of 50 or higher would be desired, so the resistor 102 would be 0.15 Ohms.

Preferably, the inductor 104 is an inductor manufactured by Coilcraft, Inc. of Cary, Ill. under part no. 0201CS-ON5XKL, the resistor 102 is a metal film type such as a part no. CPF3R50000GNB14 available from Vishay Americas of Shelton, Conn. In operation, the capacitor 106 has a capacitance of 9 pF capacitance in the near field position (e.g., when closed), and 4.5 pF capacitance in the far field position (e.g., when open). Thus, the performance of the proximity sensor 110, tuned to 2.4 GHz (C=9 pF) in the near field position, is then given as the transfer function power. The resonant frequency in the far field position, with C=4.5 pF, is $f_o$=1.7 GHz. The transfer function is:

$$T(jw) = R/R + Z_{LC}(jf)$$

where $$Z_{LC}(jw) = j2\pi(fL - 1/fC)$$

Figure 4:
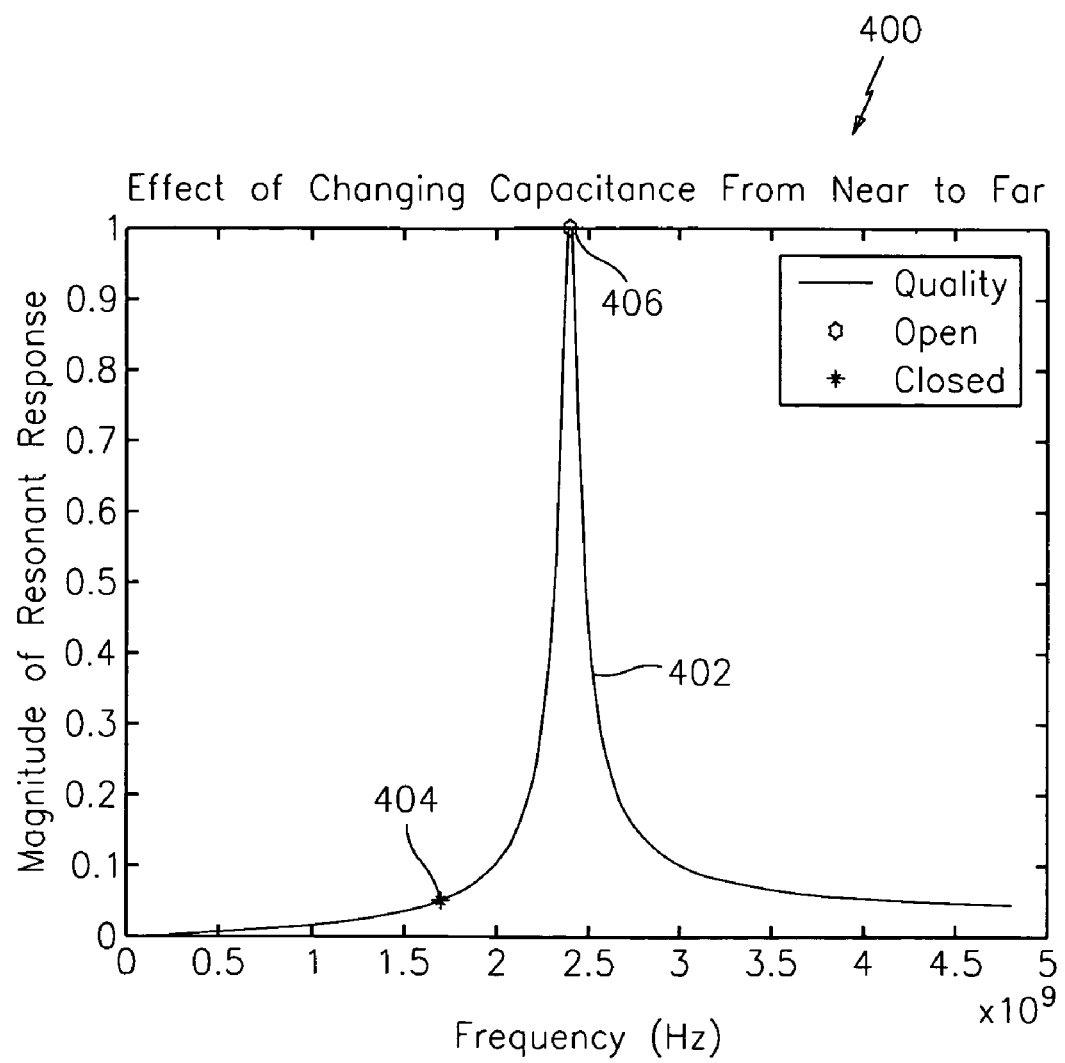
FIG. 4 is a graphical representation of the response of the proximity sensor of FIG. 3.

Referring now to FIG. 4, a graph 400 depicts the theoretical performance of the proximity sensor 110. The graph 400 illustrates the Q factor or magnitude 402 of the response of the proximity sensor 110 to an input pulse versus frequency. With the parameters noted above, the proximity sensor 110 would have a reflected magnitude 404 in the near field position of 0.048 times the input voltage and a reflected magnitude 406 in the far field position of approximately the input voltage. This difference in amplitude is easily large enough to detect between the near and far position.

Alternatively, it is envisioned that the proximity sensor 110 could go into resonance equally as well in the near field position. For such an alternative, in the near field position (e.g., closed or high capacitance) and in the far field position (e.g., open or low capacitance), the proximity sensor response is a higher frequency. For example, if the far field position capacitance is 4.5 pF, then the expected response would be 0.068 of the input voltage.

Figure 5:
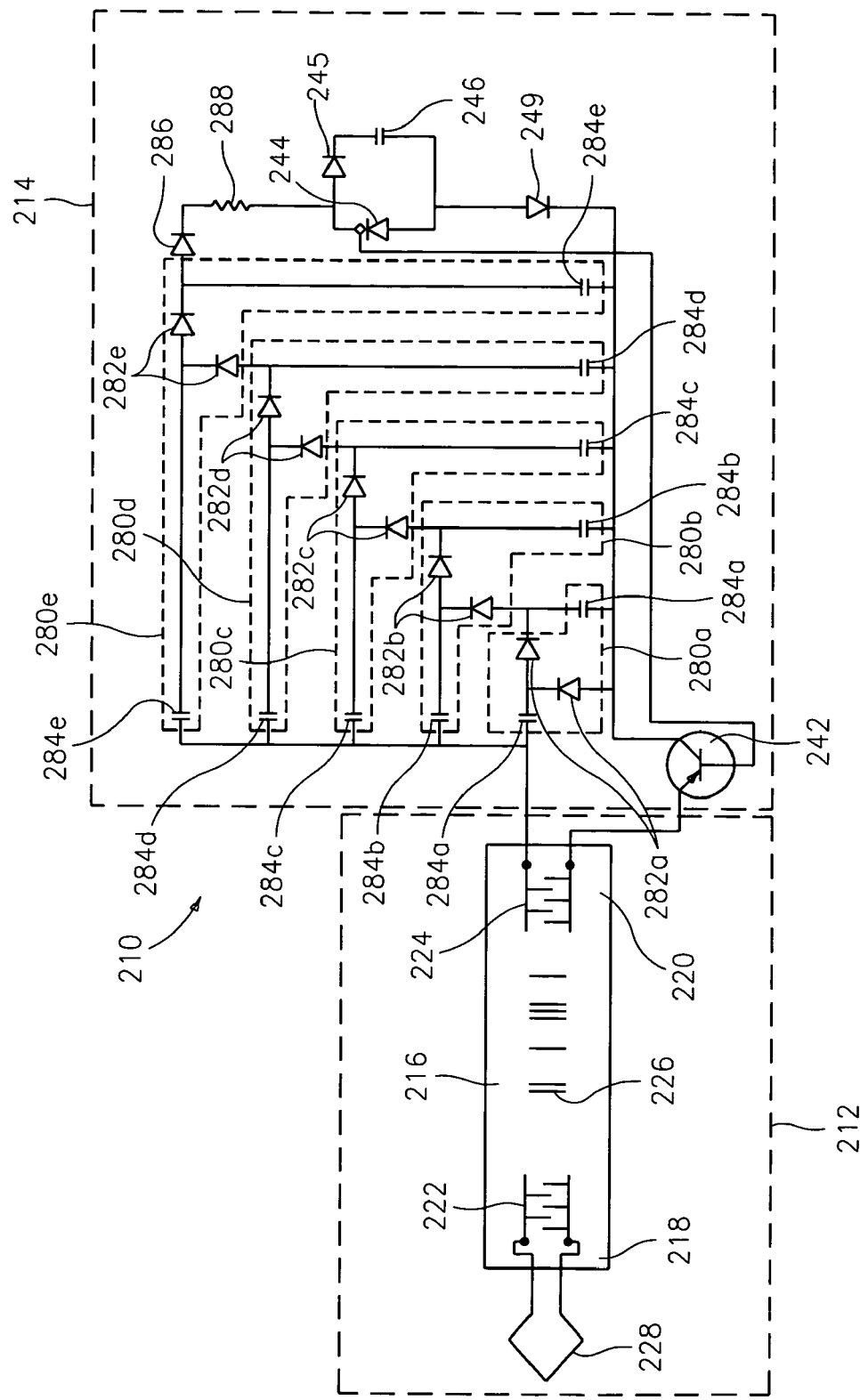
FIG. 5 is a schematic view of another proximity sensor constructed in accordance with the subject invention that includes a charge pump circuit.

Referring now to FIG. 5, another embodiment of a proximity sensor 210 is shown. As will be appreciated by those of ordinary skill in the pertinent art, the proximity sensor 210 utilizes similar principles to the proximity sensors 10, 110 described above. Accordingly, like reference numerals preceded by the numeral "2" are used to indicate like elements when possible. The primary difference of the proximity sensor 210 in comparison to the proximity sensors 10, 110 is that the load or sensing section 214 utilizes a multi-stage charge pump circuit to increase the range of the proximity sensor 210 by operating at lower voltages.

Generally, it may be desirable to increase the range of the proximity sensor 210 despite a tradeoff against other parameters such as response. Consider that the power received ($P_r$I) at the sensor is given by the following formula:

$$P_r = \frac{P_s G_s G_r \lambda^2}{(4\pi D)^2}$$

where $P_s$ is the transmitted power, $G_s$ is the transmission antenna gain, $G_r$ is the receiver antenna gain, $\lambda$ is the wavelength of the signal, and D is the distance between the interrogation unit 160 and the proximity sensor 110. The unlicensed industrial, scientific and medical (ISM) band has world-wide coverage in the 900 to 928 MHz, 2.4 to 2.483 GHz and 5.725 to 5.850 GHz ranges. A maximum transmitter output is 1 W (30 dBm), which is modified for antennas with gain over 6 dBi, pursuant to the rules governing devices in the ISM band as covered by FCC Title 47 of the Code of Federal Regulations, part 15. For example, in a system transmitting 100 mW (20 dBm) in the 2.4 GHz ISM band ($\lambda$=0.125 m), an appropriately designed transmitter antenna has a gain of 10 dBi (i.e., a linear value of 10) and the receiver has a gain of 8 dBi (i.e., a linear value of 6.3). The received power at D=3 m is then equal to $$100*6.3*4*0.125^2/(4*3.14*3)^2 \text{ mW} = 0.069 \text{ mW}$$

However, the sensing section 214 can be smartly designed to increase the range of the proximity sensor 210.

Charge pump circuits generate a voltage larger than the voltage supplied thereto. To accomplish the charge pump effect, a supply voltage ($V_{dd}$) is switched out of phase across a capacitor C. During the phase change, the following formula applies $$(V_{out} - V_{dd})*C = V_{dd}*C, \text{ or, } V_{out} = 2V_{dd}$$

In order to accommodate a load at the output, the charge pump circuit is modified by adding an output capacitance in parallel, in which case the voltage is as follows $$V_{out} = C/(C+C_{out})*2V_{dd}$$

An example of an RF powered charge pump circuit is a Dickson charge pump.

Still referring to FIG. 5, the sensing section 214 utilizes a multi-stage charge pump circuit design in combination with a switch 242, diodes 244, 245, 249, 286, a resistor 288 and a capacitor 246. As noted above with respect to FIG. 3, the capacitor 246 acts as the sensing component, which must overcome a bias voltage of the diode 244 to cycle between being seen as a high reflective load and low reflective load to the SAW device 212 when the switch 242 triggers. In a preferred embodiment, the capacitor 246 is a 1,000 uF capacitor.

In the embodiment shown, five charge pump stages 280a-e charge the capacitor 246. By cascading the charge pump stages 280a-e, the effect of each stage is cumulative. Each stage 280 includes a pair of diodes 282a-e and a pair of capacitors 284a-e, respectively. In a preferred embodiment, the value of the capacitors 284a-e is 100 uF.

The output of the five charge pump stages 280a-e passes into the diode 286. The diode 286 insures a forward bias such that the capacitor 246 only sees a negative charge. A resistor 288 is intermediate the capacitor 246 and the diode 286 in order to control the speed at which the capacitor 246 charges. A diode 249 is intermediate the capacitor 246 and collector of the switch 242. The diode 249 isolates the capacitor 246 from the AC charge pump stages 280a-e to allow the capacitor 246 to have charge accumulate under DC conditions.

In operation, the input RF signal is two, antipodal clocks with voltage $V_p$. The diodes 282a-e operate as a self-timed switch characterized by a forward bias voltage $V_d$. The charge pump stages 280a-e operate by pumping charge along the diode chain as the capacitors 284a-e are successively charged and discharged during each clock cycle. It can be shown that after N stages, the output voltage is as follows $$V_{out} = V_{in} + N*(V_p - V_d) - V_d$$

Thus, if the required $V_{out}$ is known, the number of required stages is easily calculated. In one embodiment, the five charge pump stages 280a-e integrate the signal over time to get to a desired voltage greater than 0.2 V. As a result of this increased range, the response time of the sensing section 214 is typically increased and the bandwidth is decreased.

When the capacitance of capacitor 246 is high (e.g., the near condition), the time for voltage increase at the diode 244 is long. When this voltage exceeds the backward bias of the diode 244, the switch 242 opens resulting is an open condition (e.g., the sensing section 214 is seen as a high reflection by the SAW device 212). Once the voltage across the capacitor 246 becomes substantially zero from the short across the diode 244, the switch 242 closes and the sensing section 214 provides substantially no reflection (i.e., the energy is used to charge the capacitor 246). As noted above, this cycle repeats and based upon the frequency that varies according to the capacitance of capacitor 246, the near and far positions can be easily determined.

Although a single proximity sensor is shown above in each Figure, it is envisioned that a single interrogation device may poll a plurality of proximity sensors 10, 110, 210. Referring again to FIG. 5, information 226 is encoded on the substrate 216 because the velocity of propagation of acoustic energy on the substrate 216 is typically $10^5$ times slower than the speed of light. Thus, it is possible to manufacture a plurality of proximity sensors 210 that are uniquely identified by the encoded bit pattern 226 and distinct in time due to a delay in the reflected information afforded by the slow propagation rate of acoustic energy.

It will also be appreciated that the subject proximity sensors can be applied to any application that determines positional information. For example, monitoring a valve position in a pharmaceutical application or refinery can advantageously benefit from the subject technology.

Although proximity sensors of the subject invention have been described and illustrated with respect to preferred embodiments, those skilled in the art will readily appreciate that changes or modification may be made thereto with departing from the spirit or scope of the subject invention as defined by the appending claims.

What is claimed is:

1. A proximity sensor for determining a position of an object comprising:
   (a) a SAW device having a load end and an input end, wherein the input end is adapted and configured to receive an input pulse; and
   (b) a sensing section operatively connected to the load end of the SAW device,
   wherein the sensing section is adapted and configured such that, when the object is in a first position, the sensing section provides a first response indicative of the first position and, when the object is in a second position, the sensing section provides a second response indicative of the second position, and
   wherein the position of the object is determined based upon a reflection of the input pulse.

2. A proximity sensor as recited in claim 1, wherein the SAW device includes:
   a substrate having a first end and a second end;
   an input/output IDT connected to the first end;
   a reflective IDT connected to the second end and the sensing section; and
   an antenna electrically connected to the input/output IDT such that the input/output IDT converts an electrical signal of the antenna into a SAW that propagates across the substrate where the reflective IDT converts the SAW into an electrical signal, which is injected into the sensing section.

3. A proximity sensor as recited in claim 2, further comprising an interrogation unit for providing the input pulse.

4. A proximity sensor as recited in claim 2, further comprising at least one reflective structure embossed on the substrate.

5. A proximity sensor as recited in claim 1, wherein when the object is in a first position, the proximity sensor reflects the input pulse and when the object is in a second position, the proximity sensor absorbs the input pulse.

6. A proximity sensor as recited in claim 5, wherein the sensing section includes:
   a resistor;
   an inductor connected in series with the resistor across the load end, wherein the inductor serves as a sensing component; and
   a capacitor connected in parallel to the inductor, wherein the resistor, inductor and capacitor are tuned to resonate at a pre-selected frequency.

7. A proximity sensor as recited in claim 5, wherein the sensing section includes:
   a resistor;
   an inductor connected in series with the resistor across the load end; and
   a capacitor connected in parallel to the inductor, wherein the capacitor serves as a sensing component, and
   the resistor, inductor and capacitor are tuned to resonate at a pre-selected frequency.

8. A proximity sensor as recited in claim 1, wherein when the object is in a first position, the proximity sensor repeatedly passes through a charge cycle at a first frequency and, when the object is in a second position, the proximity sensor passes through the charge cycle at a second frequency such that the first and second positions can be determined based upon the first and second frequencies.

9. A proximity sensor as recited in claim 8, wherein the sensing section includes:
   a bridge rectifier connected to the SAW device;
   a switch provided intermediate the reflective IDT and an input of the bridge rectifier;
   a diode connected in parallel with an output of the bridge rectifier; and
   a capacitor connected in parallel with the diode such that the capacitor is charged by an output of the bridge rectifier.

10. A proximity sensor as recited in claim 9, further comprising a resistor in series with the capacitor.

11. A proximity sensor as recited in claim 9, further comprising a second diode in series with the capacitor.

12. A proximity sensor as recited in claim 8, wherein the sensing section includes:
   at least one charge pump stage connected to the SAW device;
   a switch provided intermediate the reflective IDT and the at least one charge pump stage;
   a diode connected in parallel with an output of the at least one charge pump stage; and
   a capacitor connected in parallel with the diode such that the capacitor is charged by an output of the at least one charge pump stage such that the diode periodically resets the capacitor.

13. A proximity sensor as recited in claim 12, further comprising a resistor in series with the capacitor.

14. A proximity sensor as recited in claim 13, further comprising:
   a second diode in series with the capacitor and intermediate the capacitor and the resistor; and
   a third diode in series with the capacitor and intermediate the capacitor and the switch.

15. A proximity sensor for indicating a far field position and a near field position of an object comprising:
   a) a substrate having a first end and a second end;
   a) an input/output interdigital transducer (IDT) connected to the first end of the substrate;
   b) an antenna electrically connected to the input/output IDT such that the input/output IDT converts an electrical signal of the antenna into a surface acoustic wave on the substrate;

c) a reflective IDT connected to the second end of the substrate for converting the surface acoustic wave on the substrate into an electrical signal; and d) a sensing section connected to the reflective IDT for modifying the reflective IDT electrical signal based upon the near field position and the far field position of the object.

16. A proximity sensor as recited in claim 15, such that the object changes a characteristic of the sensing section.

17. A proximity sensor as recited in claim 16, wherein the characteristic is selected from a group consisting of an inductance, a capacitance and a resonance.

18. A method for ascertaining a position of a moving part comprising the steps of:

(a) generating and broadcasting an input pulse;

(b) receiving the input pulse with an antenna that converts the input pulse into an electrical signal;

(c) converting the electrical signal into a propagating surface acoustic wave;

(d) converting the propagating surface acoustic wave to an input signal for a sensing section;

(e) reflecting the input signal in the form of a second propagating surface acoustic wave;

(f) converting the second propagating surface acoustic wave into a second electrical signal;

(g) broadcasting the second electrical signal with the antenna; and (h) receiving and analyzing the broadcast second electrical signal to determine the position of the object.

* * * * *